United States Patent

Smith et al.

[11] Patent Number: 5,970,814
[45] Date of Patent: Oct. 26, 1999

[54] INTEGRATED FLOOR CONSOLE

[75] Inventors: Nels R. Smith; Scott A. Hansen, both of Holland; Kim L. Van Order, Hamilton, all of Mich.

[73] Assignee: Prince Corporation, Holland, Mich.

[21] Appl. No.: 08/985,458

[22] Filed: Dec. 5, 1997

[51] Int. Cl.[6] ................................................. F16H 59/04
[52] U.S. Cl. ................................ 74/473.15; 74/473.28; 296/37.14; 224/539
[58] Field of Search ........................... 74/473.3, 500.5, 74/501.5 R, 501.6, 502, 543, 544; 192/218; 296/37.14; 224/539

[56] References Cited

U.S. PATENT DOCUMENTS

| | | | |
|---|---|---|---|
| 3,057,221 | 10/1962 | Smith | 74/502 |
| 4,379,500 | 4/1983 | Kamino | 74/501.6 |
| 4,515,036 | 5/1985 | Dotson | 74/501.5 R |
| 5,085,481 | 2/1992 | Fluharty et al. | 296/37.14 |
| 5,189,926 | 3/1993 | Patterson et al. | 74/473.3 |
| 5,462,146 | 10/1995 | Doolittle et al. | 192/218 |
| 5,626,212 | 5/1997 | Ersoy | 74/473.3 |
| 5,887,485 | 3/1999 | VanOrder et al. | 74/473.15 |

FOREIGN PATENT DOCUMENTS

| | | | |
|---|---|---|---|
| 177342 | 3/1922 | United Kingdom | 74/500.5 |

*Primary Examiner*—Tamara L. Graysay
*Assistant Examiner*—Chong H. Kim
*Attorney, Agent, or Firm*—Price, Henevald, Cooper, DeWitt & Litton

[57] ABSTRACT

A housing supports a parking brake lever assembly, including a manual lever, a brake cable tension adjustment control, and a cable coupling assembly for coupling the lever to the vehicle's parking brake cables mounted to the chassis of a vehicle during assembly. The cable coupling assembly, tension adjustment control and parking brake lever assembly are inter-coupled and mounted to the housing forming a floor console which can be snap-fitted into a vehicle quickly during assembly with the parking brake lever automatically coupled to the vehicle's parking brake cables and the tension quickly adjusted external to the console for proper tension and operation during assembly.

15 Claims, 5 Drawing Sheets

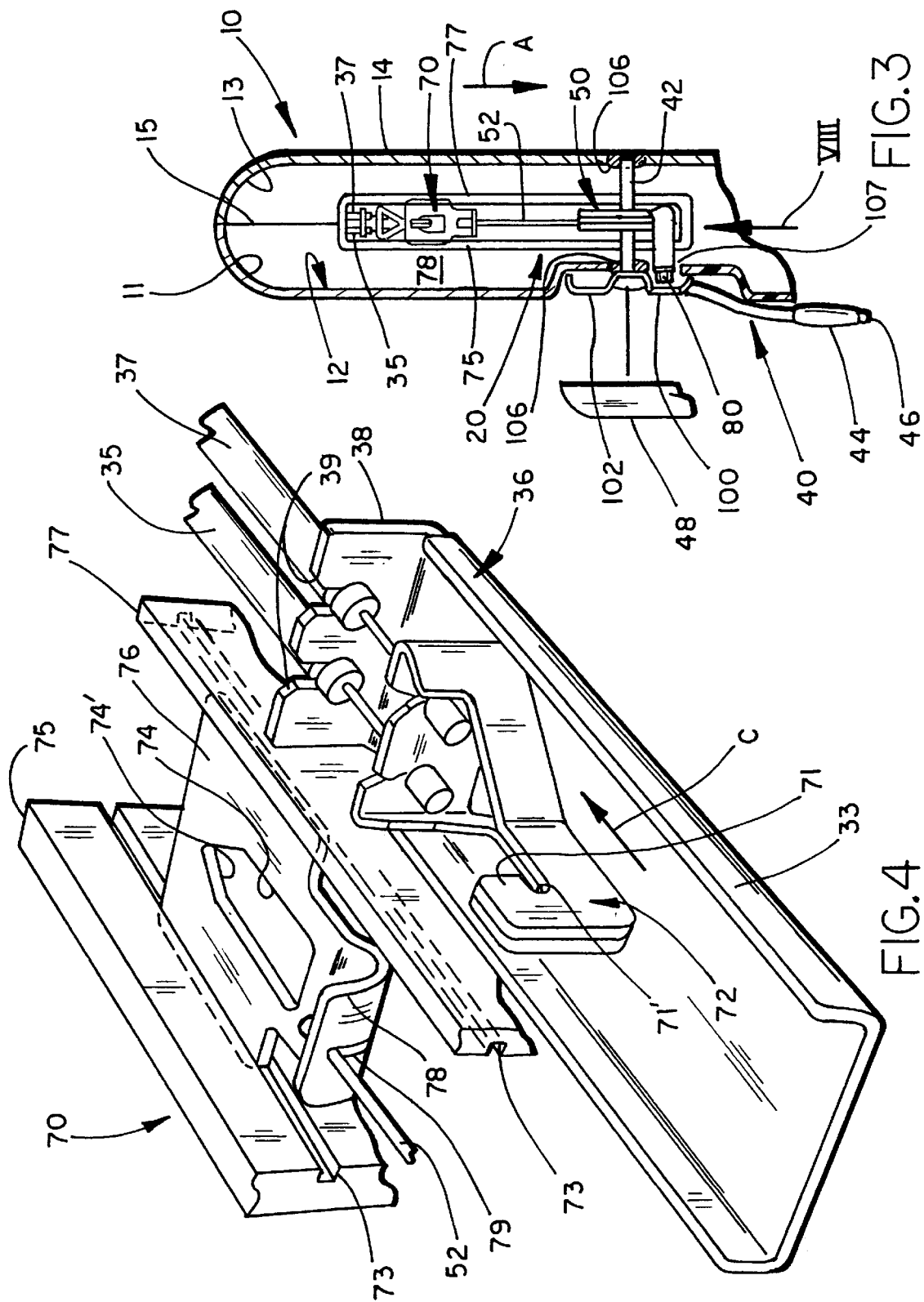

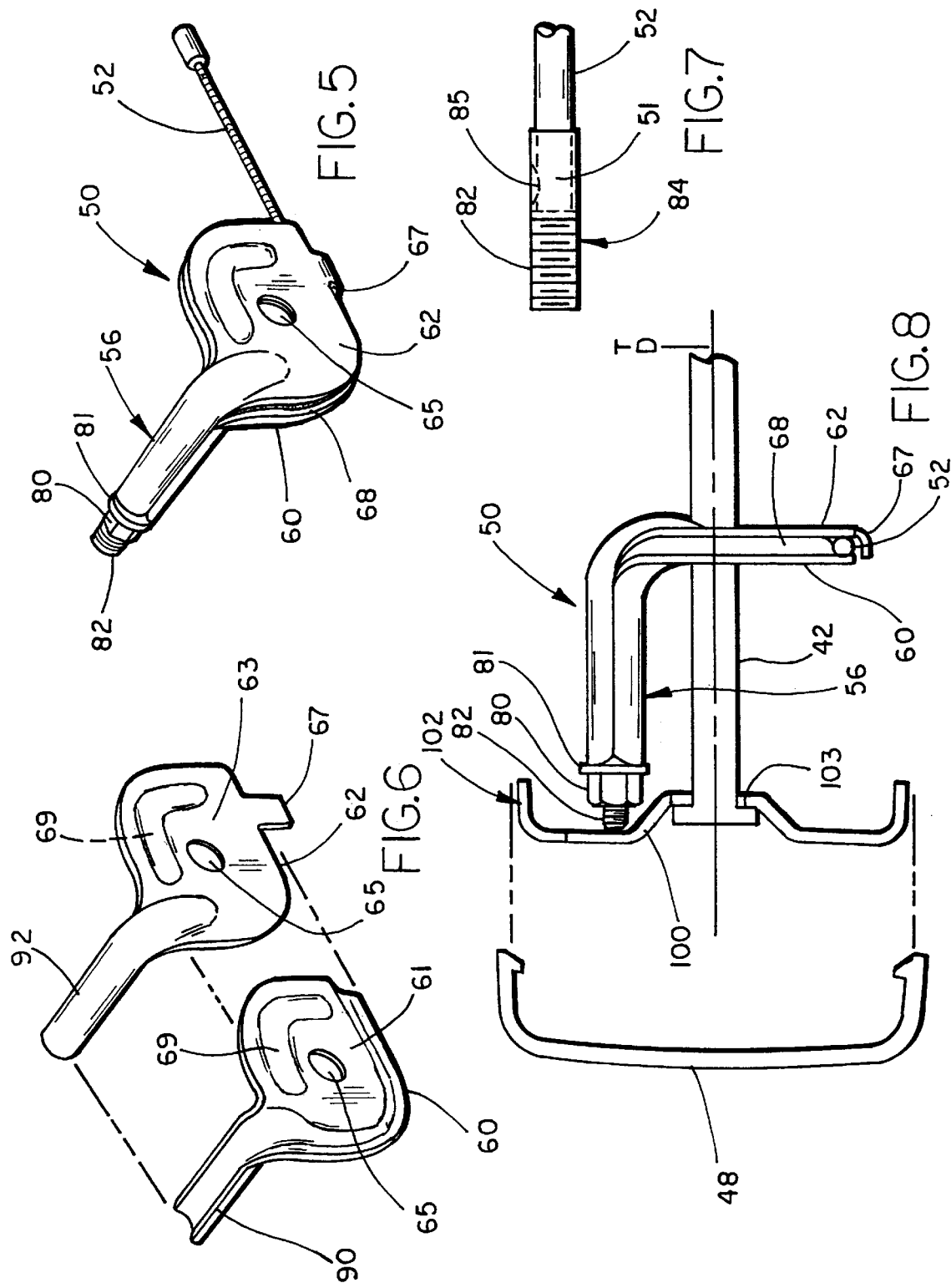

INTEGRATED FLOOR CONSOLE

BACKGROUND OF THE INVENTION

The present invention pertains to a floor console for a vehicle and particularly a floor console which includes both the transmission shifter mechanism and the parking brake control prior to installation of the console in a vehicle.

Vehicles such as automobiles, utility vehicles and the like typically include split driver and passenger front seats between which there is mounted the gear shift mechanism, parking brake and, in many models, a floor console which may includes accessories such as container holders, storage compartments and the like. In the past, the gear shift mechanism has been mounted to the vehicle during assembly as has the parking brake mechanism and the floor console subsequently placed over the existing gear shift assembly and parking brake lever. With the addition of significantly greater emphasis of the convenience afforded by floor consoles having additional convenience features, it is increasingly difficult to provide a floor console with multiple features and accommodate the assembly of the floor console onto existing vehicle structures which include parking brake levers and gear shift mechanisms. It would be desirable, therefore, to provide the console itself with the controls for both the transmission as well as the parking brake. It is, however, problematic to mount the controls for the gear shift levers on a console and couple the console to the gear shift control mechanism mounted to the vehicle floor in view of the precise adjustment necessary to assure proper operation of the transmission. A solution to this problem has been provided and is disclosed in U.S. patent application Ser. No. 08/886,571 filed on Jul. 1, 1997, and entitled VEHICLE CONSOLE WITH BUILT-IN VEHICLE TRANSMISSION SHIFTER HAVING CABLE TENSION ADJUSTMENT MECHANISM AND METHOD. The structure disclosed in this application provides a console with a gear shift mechanism which automatically couples to the gear shift control cables previously assembled to the vehicle chassis during vehicle manufacturing and assures that the gear shift controls associated with the console properly operates the transmission once the console is mounted to the vehicle. There still remains, however, a need to incorporate in a console a parking brake control mechanism, and, as with the gear shift coupling mechanism, it is necessary to accommodate for the coupling of such a parking brake control to the parking brake cable mechanism associated with the vehicle in a manner which makes assembly easy during manufacturing of the vehicle as well as provide proper operation of the parking brake.

SUMMARY OF THE PRESENT INVENTION

The system of the present invention accommodates this need by providing an integrated console having a housing which structurally supports a parking brake lever assembly, including a manual lever, a brake cable tension adjustment control, and a cable coupling assembly for operationally coupling the lever to the vehicle's parking brake cables mounted to the chassis of a vehicle during manufacturing of the vehicle. The cable coupling assembly, tension adjustment control and parking brake lever assembly are intercoupled and mounted to the console housing such that the floor console can be snap-fitted into a vehicle quickly during assembly and the parking brake lever automatically coupled to the vehicle's parking brake cables and the tension quickly adjusted externally to the console for proper tension and operation. As a result, the integrated floor console of the present invention provides the improved premanufactured assembly of an integrated floor console which includes all of the controls normally associated with floor consoles but integrated into the floor console and easily coupled to the associated control mechanism of the vehicle. The result is an improved appearing and performing floor console which has a reduced cost and which provides the desired control operation of the vehicle's transmission and parking brake and which is readily assembled to the vehicle during manufacture of the vehicle.

These and other features, objects and advantages of the present invention will become apparent upon reading the following description thereof together with reference to the accompanying drawings.

BRIEF DESCRIPTION OF THE DRAWINGS

FIG. 3 is an enlarged fragmentary vertical cross-sectional view of the parking brake assembly of the present invention taken along section lines III—III of FIG. 1;

FIG. 4 is a greatly enlarged fragmentary perspective view of the cable coupling assembly shown in FIGS. 2 and 3;

FIG. 5 is a perspective view of the cable tension adjustment control;

FIG. 6 is an exploded perspective view of a part of the assembly shown in FIG. 5;

FIG. 7 is an enlarged fragmentary side elevational view, partly in schematic form, of an end of the coupling cable also shown in FIG. 5;

FIG. 8 is an enlarged fragmentary partially exploded front elevational view of the cable tension adjustment control shown in FIG. 3 taken in the direction of arrow VIII in FIG. 3;

DETAILED DESCRIPTION OF THE PREFERRED EMBODIMENT

Figure 1:
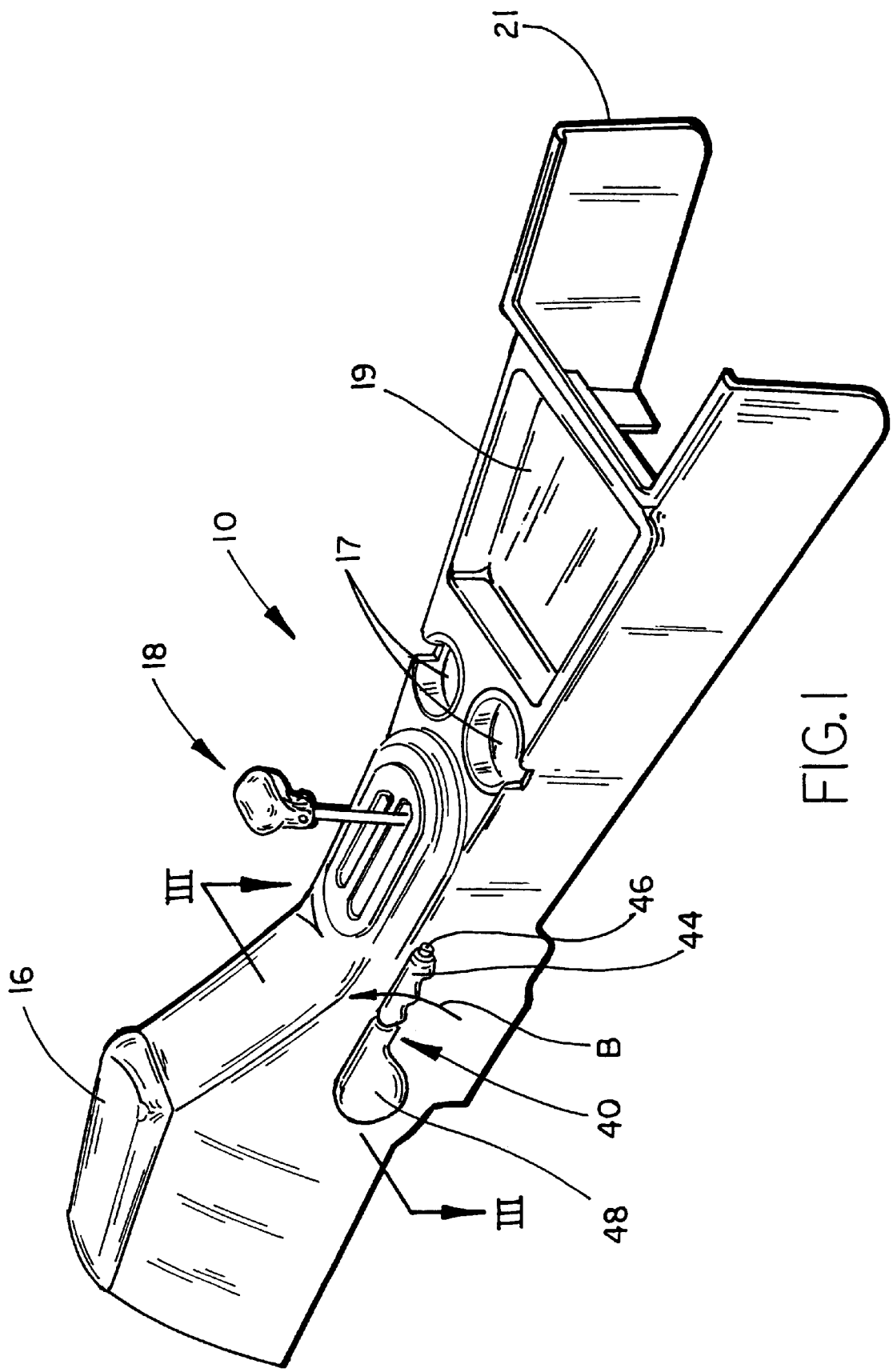
FIG. 1 is a perspective view of an integrated console embodying the present invention.
Figure 2:
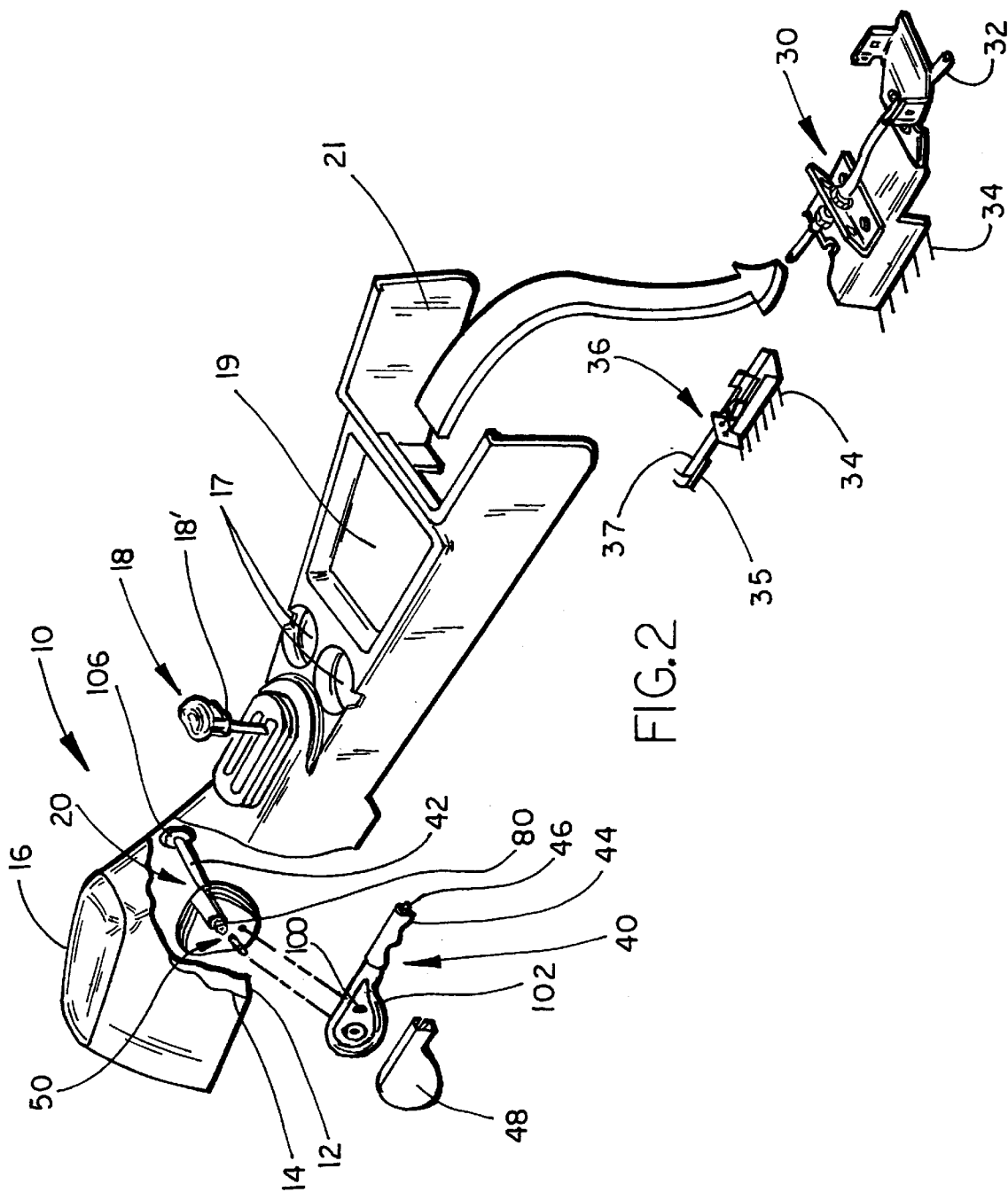
FIG. 2 is a fragmentary perspective partly broken-away exploded view of the console shown in FIG. 1 and the associated transmission coupling and parking brake coupling structure previously mounted to the vehicle floor prior to assembly of the console into a vehicle.

Referring initially to FIGS. 1–3, there is shown an integrated console 10 embodying the present invention and which includes a structural housing 12 which can be made of a rigid structural foam, polyurethane or other suitable polymeric material and may be made in two sections 11 and 13 as shown in FIG. 3 joined along a seam 15 utilizing conventional thermal-bonding processes. The structural housing 12 is covered by a suitable decorative surface 14 over the exterior of the console 10 to conform the appearance of the console to that of the vehicle interior. Such decorative trim may include upholstery material or finishing the molded housing with a textured surface and color or laminating the housing 12 with a shell formed with the desired surface finish. The structural housing 12 has sufficient strength to support the transmission control assembly 18 mounted within the housing in a manner described in the above identified patent application Ser. No. 08/886,571 filed Jul. 1, 1997, and entitled VEHICLE CONSOLE WITH BUILT-IN VEHICLE TRANSMISSION SHIFTER HAVING CABLE TENSION ADJUSTMENT MECHANISM AND METHOD, the disclosure of which was incorporated herein by reference. Housing 12 also supports the parking brake control assembly 20 of the present invention, which is located in the housing, as best seen in FIG. 2, behind the transmission control assembly 18. Console 10 further includes an armrest 16 conveniently located between the driver and passenger seats when the console is assembled to a vehicle, a pair of container holders 17 positioned forwardly of the transmission control assembly 18 and a storage tray 19 which may or may not be covered and which accommodates items to be stored in a convenient location in the floor console. The armrest 16 may also include a storage compartment under the padded cover forming the top of the armrest which compartment is located behind the parting brake assembly 20.

Housing 12 includes suitable fasteners (not shown) which can be of the type disclosed in U.S. Pat. No. 5,106,143 or in the above identified copending patent application for snap-fitting the console to the vehicle floor by first inserting the forward end 21 of console 10 to the associated coupling structure and subsequently snap-fitting the rearward end (in the location of armrest 16) downwardly, simultaneously coupling the gear shift assembly mechanism 18 and parking brake assembly 20 to the preinstalled mating structure mounted to the floor of the vehicle. This structure includes, as best seen in FIG. 2 (and with respect to the parking brake assembly also in FIGS. 3 and 4), a transmission cable coupling assembly 30 for coupling to the transmission control assembly 18 upon insertion of console 10 such that the transmission control lever 18' will operate the transmission shift cable 32 associated with transmission control assembly 30 for shifting the transmission during use of the vehicle. The transmission coupling assembly 30 is mounted to the floor 34 of a vehicle shown schematically in FIG. 2. In addition to the transmission coupling assembly 30, mounted to the vehicle floor is a brake cable docking assembly 36 which, as described in greater detail below, couples to the cable coupling assembly 70 (FIGS. 3 and 4) of the parking brake assembly 20 for coupling the brake control lever 44 for the operation of a pair of parking brake cables 35 and 37.

The parking brake assembly 20 comprises a parking brake lever assembly 40, a cable tension adjustment assembly 50 and a cable coupling assembly 70 for inter-coupling the parking brake lever 40 to brake cables 35 and 37 premounted to the vehicle. This structure is now described initially in connection with FIGS. 3–8 followed by a description of the mounting of the console 10 to the vehicle as described in connection with FIGS. 9 and 10.

The parking brake lever 40 is coupled to a cable tension adjustment assembly 50 which, in turn, couples a coupling cable 52 to the brake control cables 35, 37 through the cable coupling assembly 70. Thus, movement of parking brake lever 40 through pivoting rotation about pivot axle 42 utilizing handle 44 and a push-button conventional ratchet release 46 rotates the tension adjustment control 50 pulling cable 52 forwardly in the direction indicated by arrow A in FIG. 3 to apply the parking brake when handle 40 is moved rearwardly in the direction indicated by arrow B in FIG. 1. The coupling cable 52 and its interconnection with the docking member 36 is best seen in FIGS. 3 and 4.

The docking station 36 is mounted to the vehicle floor 34 (FIG. 2) and includes a generally U-shaped channel 33 (FIG. 4) with an end wall 38 for receiving the terminal ends of cables 35 and 37 through slots 39 which engage the outer sheath terminals of the cables which have their coaxially-mounted inner control cables extending into and lockably secured to a hook 72 which engages a slot 74 in sliding plate 76 associated with the cable coupling assembly 70. Sliding plate 76 includes an upwardly extending end 78 with a notch 79 for receiving one end of coupling cable 52. It is to be understood that the parking brake mechanism itself provides a spring bias force on hook 72 in the direction indicated by arrow C in FIG. 4, which is opposite that of arrow A, such that when the parking brake is released, the parking brake lever 40 moves to its forward brake released position. Sliding plate 76 is slidably supported between a pair of slide blocks 75 and 77 which are mounted to the floor 78 of housing 12 (FIG. 3) or to a suitable cross member extending between the sidewalls of the housing 12 to position the sliding plate 76 with slot 74 in general alignment above hook 72 when the console 10 is positioned in the vehicle. The blocks 75, 77 each include elongated slots 73 for slidably and captively receiving the opposite edges of plate 76. Notch 74 includes a tapered rearwardly extending end 74' which snap-fits over the L-shaped section 71 of hook 72 during installation. Hook 72 has a slot 71' with a height slightly greater than the thickness of sliding plate 76 for lockably holding the plate to the hook once installed. The tension on the coupling cable 52 is adjusted upon assembly of the console to the vehicle by the cable tension control assembly 50, which is now described in connection with FIGS. 3 and 5–8.

The tension adjustment control assembly 50 provides Y-axis (i.e., side entry) adjustment for the coupling cable 52 and the coupling of brake lever 40 to brake cables 35, 37 through the side of housing 12 when the snap-fitted cover cap 48 is removed for providing access to an adjustment nut 80 (FIGS. 2, 3, 5 and 8) which, in turn, is threadably mounted to a threaded end 82 of a fitting 84 receiving the end 51 of coupling cable 52, which is suitably locked within the hollow end of fitting 84 by means of a swage 85 or other conventional means for terminating and holding the end 51 of cable 52 to fitting 84. Fitting 84 extends from the end of hollow arm 56 of cable tension adjustment assembly 50 which provides the offset orthogonal direction change for cable 52 as well as the adjustment of the tension on cable 52. A flat washer 81 extends between the end of arm 56 and adjustment nut 80.

The tension adjustment control assembly 50 comprises a housing having halves 60 and 62 (FIG. 6) with generally disk-shaped planar bodies 61 and 63, respectively, each having a central opening 65 aligned to allow the pivot axle 42 of the parking brake assembly 40 to extend therethrough. The axle 42 preferably is locked to the housing 60, 62 during preassembly as, for example, by spot welding the junction of the two or by other means. Alternately, the apertures 65 can be keyed to a square section of shaft 42 such that rotation of the shaft 42 by operation of handle 44 also rotates the cable tension control assembly 50 to which coupling cable 52 is attached. Housing 62 includes a downwardly extending tab 67 which is subsequently formed over, as seen in FIG. 5, to hold the cable 52 in the circumferential groove 68 defined by the spacing between housings 60 and 62 which, in turn, is provided by facing L-shaped formed ridges 69. The housings 60, 62 integrally include curved semicylindrical sections 90 and 92, respectively, which, when the mounted together, define the hollow cylindrical arm 56 extending in orthogonal relationship to the extending end of coupling cable 52, as seen in FIG. 5, and in offset relationship to the pivot axle 42 by distance D (FIG. 8) to apply tension on cable 52 when the parking brake lever 40 is rotated rearwardly using handle 44. Cable 52 thus rides within the peripheral groove 68 extending from the bottom of housings 60, 62 under tab 67 and then upwardly and outwardly through hollow arm 56 terminating in fitting 84 which, with its threaded end, allows the slack in cable 52 to be taken up by tightening of nut 80 on threaded end 82 of fitting 84.

Nut 80 is accessible through aperture 107 (FIG. 3) in the sidewall of housing 12 of the console 10 when cap 48 is removed exposing an aperture 100 in handle mounting disk 102 to which axle 42 is also welded at seam 103, as seen in FIG. 8. Thus, during assembly, once the console 10 is mounted to the vehicle and prior to the installation of decorative cap 48 over handle assembly 40, a torque wrench with a socket having a size corresponding to that of adjustment nut 80 is inserted through aperture 100 over nut 80 and nut 80 is adjusted until the desired precalibrated tension on coupling cable 52 is reached. Cap 48 is then positioned over disk 102 and snap-fitted thereto with the inwardly projecting tabs on the disk, as best seen in FIG. 8. The pivot axle 42 for the brake assembly 20 is rotatably mounted and supported between the sidewalls of housing 12 and for such purpose reinforcement mounting bosses 106 (FIG. 3) on each of the sidewalls may be desirable to add additional strength to the console in the axle mounting area. Bosses 106 can be integrally molded with the housing halves 11, 13 as a thickened section. The housing half 11 also includes the aperture 107 aligned with aperture 100 in disk 102, as seen in FIG. 3, to allow clearance for the adjustment tool.

Figure 9:
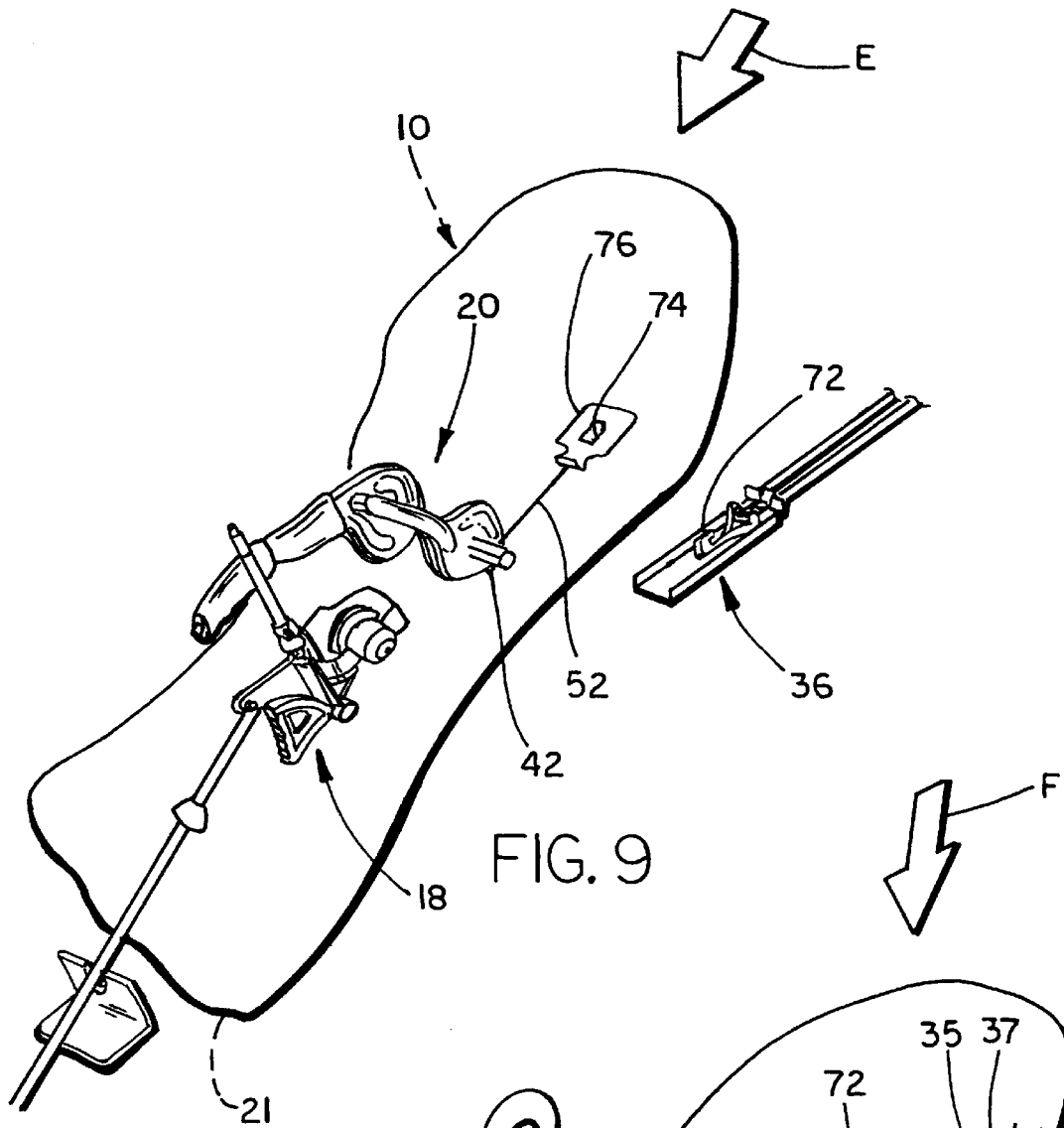
FIG. 9 is a pictorial perspective view, partly in phantom form, illustrating the assembly operation for mounting the integrated floor console to a vehicle during a first stage of assembly.
Figure 10:
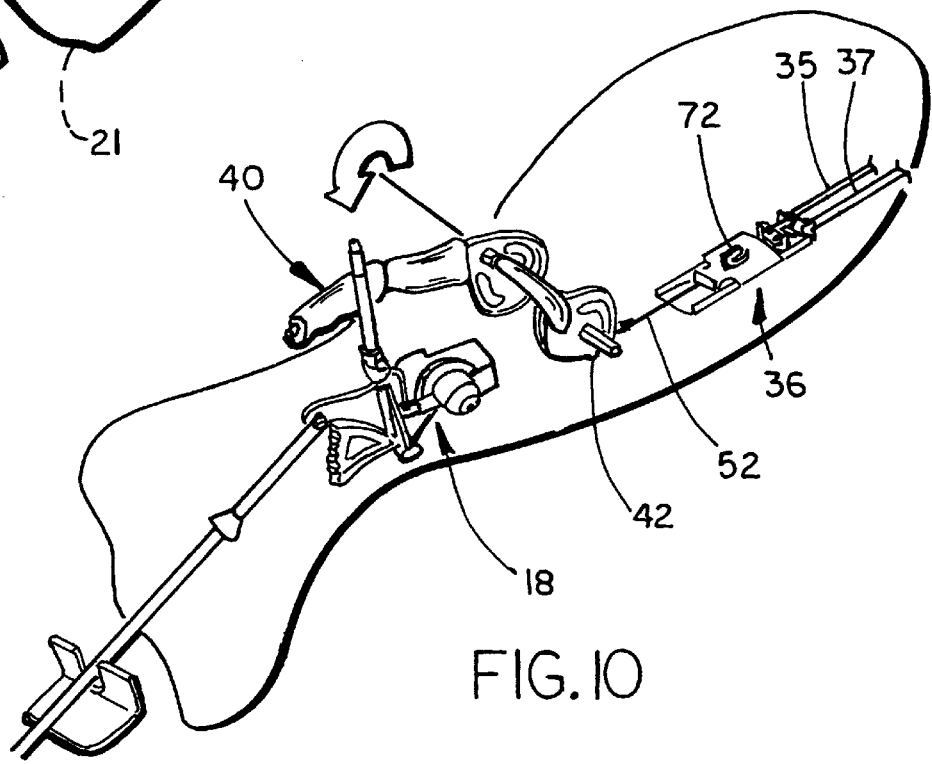
FIG. 10 is a pictorial perspective view, partly in phantom form, of the completion of the assembly of the integrated floor console to a vehicle.

The installation of the integrated console 10 is seen in the pictorial representations of FIGS. 9 and 10 where the outer profile of the console is shown in phantom form. The parking brake assembly 20 is positioned with sliding plate 76 above and in general alignment with the docking assembly 36, as seen in FIG. 9, and the front end 21 of the console is inserted into its fasteners by sliding the console forwardly, as indicated by arrow E. The rear end of the console is then pressed downwardly as indicated by arrow F in FIG. 10 causing the tapered aperture 74' in plate 76 to snap over the latching hook 72 of docking station 36 interlocking the coupling cable 52 and parking brake handle assembly 40 to the vehicles parking brake control cables 35 and 37, as seen in FIG. 10. The transmission control assembly 18 at the same time inter-couples to the transmission coupling assembly 30 as described in the above-identified copending application. Thus, as the console is snap-fitted and locked to the vehicle floor, at the same time the transmission control and parking brake assembly snap-fits and locks to the transmission control cables and parking brake cables. The parking brake cable tension can then be easily accessed from the side of console 10 for proper tension adjustment of the coupling cable 52 to the brake control cables 35, 37. With the system of the present invention, therefore, an integrated console 10 is provided which conveniently includes several accessories such as container holders, storage compartments, armrests and the like and which integrally includes not only the transmission control assembly 18 but also the parking brake control 40 allowing the automatic coupling of these controls to the vehicle upon snap-locking of the console to the vehicle during assembly. This advantageous construction allows the console to be preassembled with such vehicle accessories located on the console in an ergonomically logical arrangement and inter-coupled to the vehicle automatically for installation, allowing for proper operation of the transmission and parking brake of the vehicle. The result is a high quality, attractive integrated console with reduced cost and improved functional characteristics.

It will become apparent to those skilled in the art that various modifications to the preferred embodiment of the invention as described herein can be made by those skilled in the art without departing from the spirit or scope of the invention as defined by the appended claims.

The invention claimed is:

1. An integrated vehicle floor console comprising:
   a housing for mounting to a vehicle floor, said housing including a parking brake lever assembly mounted thereto;
   a tension adjustment control coupled to said parking brake lever assembly and including a coupling cable, wherein said housing includes an access opening and said tension adjustment control comprises a cable guide extending in a direction orthogonal to the longitudinal direction of motion of the coupling cable during operation of said brake lever to allow the end of the coupling cable to be accessed for adjusting the tension thereon, and wherein said tension adjustment control further includes an end fitting engaging a second end of said coupling cable and including a threaded section for receiving an adjustment nut for adjusting the tension on said coupling cable; and
   a cable coupling assembly coupled to an end of said coupling cable remote from said parking brake lever for coupling said end of said coupling cable to a vehicle parking brake cable upon installation of said console to the vehicle, and wherein said cable coupling assembly includes a plate slidably mounted to said housing, said plate including means for coupling said plate to a docking member for said parking brake cable.

2. The console as defined in claim 1 wherein said plate includes a notch having a dimension to slide over a corresponding connecting member of a docking station for a vehicle parking brake.

3. A parking brake assembly including:
   a housing for mounting to a vehicle floor, said housing including a parking brake lever pivotally mounted thereto and wherein a pivot axle is rotatably coupled to said housing and said parking brake lever and said tension adjustment control are coupled to said pivot axle;
   a coupling cable including a tension adjustment control extending to a side of said housing, said tension adjustment control coupled to said parking brake lever; and
   a coupling assembly coupled to an end of said coupling cable remote from said parking brake lever for coupling said end of said coupling cable to a plate slidably mounted to said housing, said plate including means for coupling said plate to a docking member for a vehicle's parking brake cable, wherein said housing includes an access opening and said tension adjustment control includes a cable guide extending in a direction orthogonal to the longitudinal direction of motion of the coupling cable during operation of said brake lever to allow the end of the coupling cable to be accessed from a side of said housing for adjusting the tension of said coupling cable; and
   wherein said tension adjustment further includes an end fitting engaging a second end of said coupling cable and including a threaded section for receiving an adjustment nut for adjusting the tension on said coupling cable.

4. The assembly as defined in claim 3 wherein said plate includes a notch having a dimension to slide over a corresponding connecting member of a docking station for a vehicle parking brake.

5. The assembly as defined in claim 4 wherein said housing is molded of a polymeric material.

6. The assembly as defined in claim 5 wherein said housing defines a console and said console includes a transmission control.

7. The assembly as defined in claim 6 wherein said console includes at least one container holder.

8. The assembly as defined in claim 7 wherein said console includes an armrest.

9. The assembly as defined in claim 8 wherein said console includes a storage compartment.

10. The assembly as defined in claim 9 wherein said housing has a sidewall having an aperture aligned with said adjustment nut of said tension adjustment control.

11. A parking brake assembly including:
    a housing for mounting to a vehicle floor, said housing including a parking brake lever pivotally mounted thereto; and
    a coupling assembly coupled to said parking brake lever for coupling to a vehicle parking brake cable when said housing is attached to the floor of the vehicle, wherein said coupling assembly includes a plate slidably mounted to said housing, said plate including means for coupling said plate to a docking member of a vehicle's parking brake cable.

12. The assembly as defined in claim 11 wherein said means for coupling comprises a slot formed in said plate and having a dimension to slide over a corresponding connecting member of a docking station for a vehicle parking brake.

13. The assembly as defined in claim 12 and further including a cable coupling said plate to said brake lever.

14. The assembly as defined in claim 13 and further including a tension control coupled to said cable for adjusting the tension on said coupling cable.

15. An integrated vehicle floor console comprising:
    a housing made of a polymeric material for snap-mounting to a vehicle floor, said housing integrally including a parking brake lever assembly and a transmission control assembly, wherein said parking brake lever assembly includes a coupling plate slidably mounted to said housing for coupling to a parking brake fixture on the floor of a vehicle; and
    said housing integrally including a decorative outer surface.

* * * * *